Dec. 1, 1953     F. T. MOSER     2,660,964
NOZZLE FOR MAKING PACKAGED SUNDAES
Filed May 18, 1950
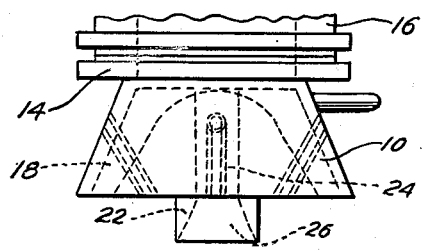
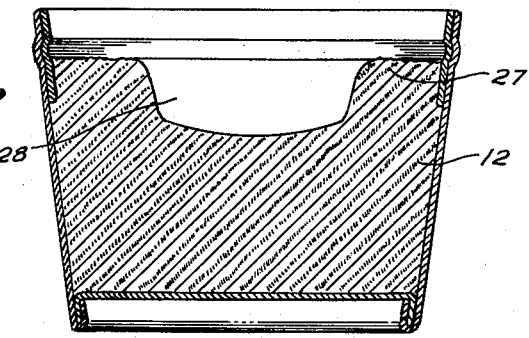
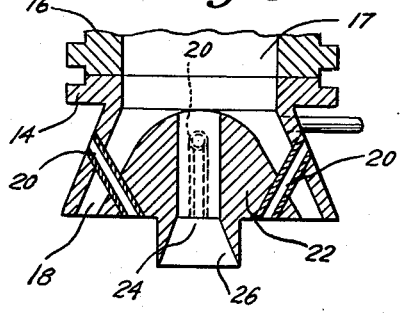
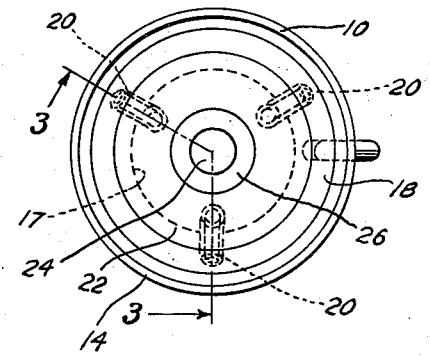
INVENTOR.
*Frank T. Moser*
BY
*Joseph H. Schofield*
ATTORNEY Patented Dec. 1, 1953

2,660,964

UNITED STATES PATENT OFFICE 2,660,964

NOZZLE FOR MAKING PACKAGED SUNDAES

Frank T. Moser, Easton, Pa.

Application May 18, 1950, Serial No. 162,718

1 Claim. (Cl. 107—27)

This invention relates to ice-cream sundaes and particularly to an improved packaged sundae that may be stored indefinitely at low temperatures after being made up by adding a syrup, fruits or other topping to a partially congealed ice-cream mix, the ice-cream mix, partially frozen and congealed, being poured into a suitable paper or other disposable container preferably in quantities sufficient for a single serving only.

An object of importance is that the ice-cream mix, partially frozen to a proper low temperature, is poured or forced into the container simultaneously in two streams in a manner to form a central well and to be entirely free of air pockets within the substantially annular mass of the ice-cream mix.

A feature of importance of the invention is that a special form of nozzle is employed in the filling of the container with ice-cream mix so that a central and an annular stream of mix are forced simultaneously downward from a supply in a suitable pump into the container, the annular stream being separated from the central stream by an annular air space from which entrapped air may escape as the filling of the container continues.

Another object of the present invention is that one or more air relief passages are provided extending through the nozzle preferably through the support for the central nozzle member so that any accumulation of air within the space between the central and annular streams during the filling of the cup may escape through the passage through the support to the outer air.

It is therefore a primary feature of the invention to provide one or more air relieving tubes in the nozzle advantage being taken of the connecting and supporting means for the separated parts of the nozzle, one or more of these supporting means being tubular, the lower ends of the supporting means extending to the lower annular surface of the central member and their upper ends to the outer surface of the annular member.

With the above and other objects in view, the invention may include the features of construction and operation set forth in the following specification and illustrated in the accompanying drawing.

In the accompanying drawing annexed hereto and forming a part of this specification, I have shown the invention embodied in a paper cup form of packaged sundae in which a low freezing syrup is added to the previously admitted foundation of partially congealed ice-cream, but it will be understood that the invention can be otherwise embodied and that the drawing is not to be construed as defining or limiting the scope of the invention, the claims appended to this specification being relied upon for that purpose.

In the drawing:

Fig. 1 is a side elevation of a filling nozzle made according to my invention;

Fig. 2 is a side view in section showing a cup filled with ice-cream by the nozzle shown in Fig. 1 and prior to the addition of the syrup or topping;

Fig. 3 is a central vertical sectional view of the nozzle shown in Fig. 1, and

Fig. 4 is a bottom plan view of the nozzle shown in Figs. 1 and 3.

In the above mentioned drawing there has been shown but one embodiment of the invention which is now deemed preferable but it is to be understood that changes and modifications may be made within the scope of the appended claim without departing from the spirit of the invention.

This invention is a continuation in part of my co-pending application Ser. No. 50,509 filed September 22, 1948, now abandoned, which is a division of my application Ser. No. 791,974 filed December 1, 1947, and now U. S. Patent No. 2,486,194 granted October 25, 1949.

Briefly, and in its preferred aspect, the invention may include a nozzle made as shown in the drawing and having two principal parts, a central and an annular member, the means or at least one of the members employed to connect and retain these two principal members together in fixed spaced position being hollow, and preferably in the form of a short tube disposed as shown most clearly in Fig. 3.

In filling the cups with ice-cream mix, the annular stream of mix forms a complete substantially cylindrical wall of liquid above the cup and as the cup fills the entrapped air must be exhausted or allowed to escape to prevent large air pockets or bubbles being formed throughout the mix. To prevent the formation of these air pockets and to permit air within the cup and enclosed by the enclosing annular stream of mix to escape, passages are provided through the nozzle for the air to escape from the cup above the surface of the mix.

Referring more in detail to the figures of the drawing there has been shown in Fig. 1 a nozzle 10 located centrally above a conventional form of paper cup 12 shown already filled in Fig. 2. As shown most clearly in Fig. 3 the nozzle 10 comprises two principal members, first a body member 14 the upper surface of which is provided with means to attach it to the lower or discharge end of an ice-cream filling tube 16. This fastening means may comprise a flange at the upper end of the annular member 14. The side walls of the annular body member 14 are flared so that an axial central opening 18 of increasing cross-sectional area is provided through this body portion.

Within the body portion 14 and retained centrally therein by suitable pins 20 or other means, presently to be more fully described, is a central member 22 having a central axial opening 24 therethrough and whose outer side wall is spaced from the inner surface of the flared lower portion of the body member 14. The upper end of this opening 24 is in communication with the opening 18. As shown at 26 in Fig. 3, the lower end of the axial opening 24 through the central member 22 may be flared. The areas of the opening 24 through the central member 22 and the annular opening 18 between the inner surface of the body member 14 and the outer surface of the central member 22 at the flared portion of the nozzle are so proportioned that the ice-cream mix will flow simultaneously downward through the central and annular openings 24 and 18 to fill a cup substantially as shown in Fig. 2. The annular portion of the space 27 within the cup 12 will be filled to or slightly above the level of the cover line. The central portion, however, will be but partially filled to leave a central depression 28 to be filled, before the cover is placed in position, by a suitable topping or syrup. By varying the cross sectional areas of the central and annular openings 24 and 18 in the nozzle 10 the width and depth of the depression or well 28 may be varied as desired to permit a larger or smaller amount of topping to be added before closing the top with the cover plate.

As shown in Fig. 3 the pins or supports 20 retaining the body member 14 and the central member 22 in fixed position to each other are hollow. The lower ends of these pins or supports extend to the lower surface of the central member 22 around its central projection where, during the filling of the cup 12, they will be within the upper portion of the space enclosed by the annular stream of ice-cream mix flowing from the opening 18. The upper and outer ends of the pins or supports 20 extend to the outer peripheral surface of the nozzle. Air entrapped within the cup 12 by the annular stream from opening 18 therefore may escape through one or more of the pins of which three are shown, one or more of which may be tubular.

In operation the nozzle 10 is attached at its upper end surface to the lower end of a discharge tube or opening 16 of a standard ice-cream filling machine (not shown). The mix as it enters the nozzle 10 through inlet opening 17 is partially congealed so that while still semi-fluid it will retain its form momentarily after filling. While the ice-cream mix is still in this form within the cup a syrup may be admitted to the central depression formed in the top surface of the mix through another nozzle (not shown). When thus filled with ice-cream mix and with syrup filling the depression 28, the cover is applied in the usual manner. The completely filled and capped container is then ready for final and complete freezing which, to prevent the syrup from falling to the bottom of the cup and out of sight, may take place with the container in inverted position.

During the filling of the cup the air replaced by the ice-cream mix being admitted to the cup and enclosed by the wall of mix in the annular stream flowing from opening 18 may escape through one or more of the hollow pins 20 to the outer air.

I claim as my invention:

A filling nozzle comprising a central member and an annular member, said annular member being adapted for attachment to the discharge conduit of a filling machine and having a central axially extending inlet opening and a flaring concentric exit opening, attaching means for securing said central member to said annular member, said central member having a central axis opening extending therethrough the upper end of which intercepts the upper end of the opening through the annular member, and said attaching means comprising hollow pins extending from the lower surface of the central member to the outer surface of said annular member, whereby entrapped air during the filling operation may escape from within the annular stream of mix from the annular opening between the two principal members of the nozzle.

FRANK T. MOSER.

References Cited in the file of this patent

UNITED STATES PATENTS

| Number | Name | Date |
|---|---|---|
| 827,306 | Herisse | July 31, 1906 |
| 1,465,749 | Westerman | Aug. 21, 1923 |
| 1,829,120 | Toews | Oct. 27, 1931 |